US012552529B2

(12) United States Patent
Medici et al.

(10) Patent No.: US 12,552,529 B2
(45) Date of Patent: Feb. 17, 2026

(54) CONVERTIBLE AIRCRAFT CAPABLE OF HOVERING

(71) Applicant: LEONARDO S.P.A., Rome (IT)

(72) Inventors: Luca Medici, Samarate (IT); Riccardo Bianco Mengotti, Samarate (IT); Andrea Bavetta, Samarate (IT); Marco Basaglia, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/865,856

(22) PCT Filed: Apr. 21, 2023

(86) PCT No.: PCT/IB2023/054082
§ 371 (c)(1),
(2) Date: Nov. 14, 2024

(87) PCT Pub. No.: WO2023/223120
PCT Pub. Date: Nov. 23, 2023

(65) Prior Publication Data
US 2025/0304249 A1   Oct. 2, 2025

(30) Foreign Application Priority Data
May 18, 2022  (EP) ..................... 22174103

(51) Int. Cl.
*B64C 29/00* (2006.01)
*B64C 5/06* (2006.01)
*B64C 39/12* (2006.01)

(52) U.S. Cl.
CPC ...... *B64C 29/0033* (2013.01); *B64C 29/0025* (2013.01); *B64C 39/12* (2013.01); *B64C 5/06* (2013.01)

(58) Field of Classification Search
CPC . B64C 29/0033; B64C 29/0025; B64C 39/12; B64C 39/04; B64C 5/06
See application file for complete search history.

(56) References Cited

U.S. PATENT DOCUMENTS 9,120,560 B1   9/2015   Armer et al.
10,011,349 B2  7/2018   Ivans et al.
(Continued)

FOREIGN PATENT DOCUMENTS

WO   2020105045 A   5/2020

OTHER PUBLICATIONS

International Search Report and Written Opinion for corresponding PCT Application No. PCT/IB2023/054082 mailed Jul. 21, 2023 (16 pages).

*Primary Examiner* — Rodney A Bonnette
(74) *Attorney, Agent, or Firm* — Leason Ellis LLP

(57) ABSTRACT

An aircraft comprising a fuselage with a nose and a tail arranged on opposite parts to each other along a first longitudinal axis is described; a pair of half-wings arranged on respective mutually opposite sides of the fuselage; a first and a second rotor carried by respective half-wings, respectively rotatable around a second and third axis inclinable with respect to said fuselage, and independently operable from each other; the aircraft is switchable between a first hovering flight or take-off/landing configuration wherein the fourth and fifth axis are arranged orthogonal to said first axis; and a second forward flight configuration wherein the fourth and fifth axis are arranged parallel or inclined with respect to said first axis; the aircraft further comprising a tail portion comprising a first aerodynamic surface, and a third and a fourth rotor rotatable around a fixed fourth and a fifth (Continued)

axis; and support means of the third and fourth rotor connected to a corresponding said half-wing and to a corresponding said fin.

12 Claims, 8 Drawing Sheets

(56) References Cited

U.S. PATENT DOCUMENTS

| | | |
|---|---|---|
| 2010/0230532 A1 | 9/2010 | Dietrich et al. |
| 2020/0108918 A1 | 4/2020 | Douglas et al. |
| 2020/0277045 A1 | 9/2020 | Parks et al. |
| 2021/0197965 A1 | 7/2021 | Kunz et al. |
| 2021/0253234 A1 | 8/2021 | Tao et al. |

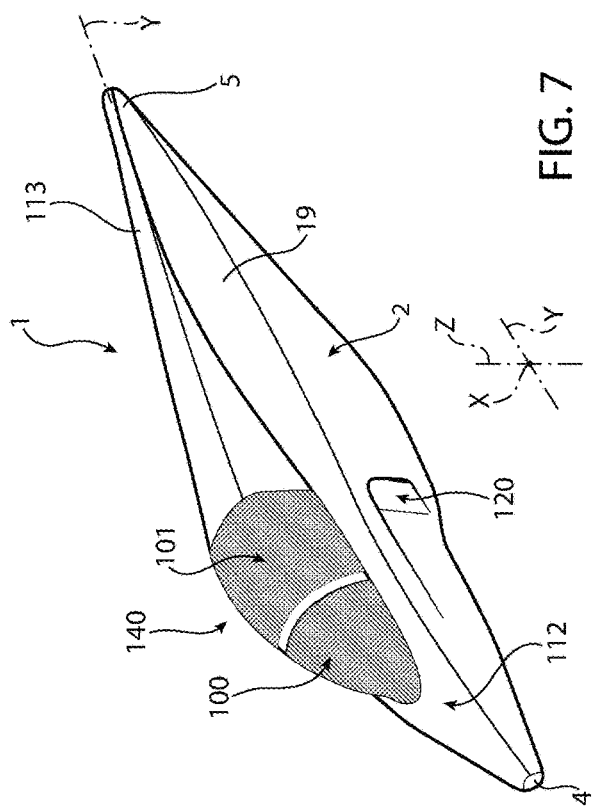
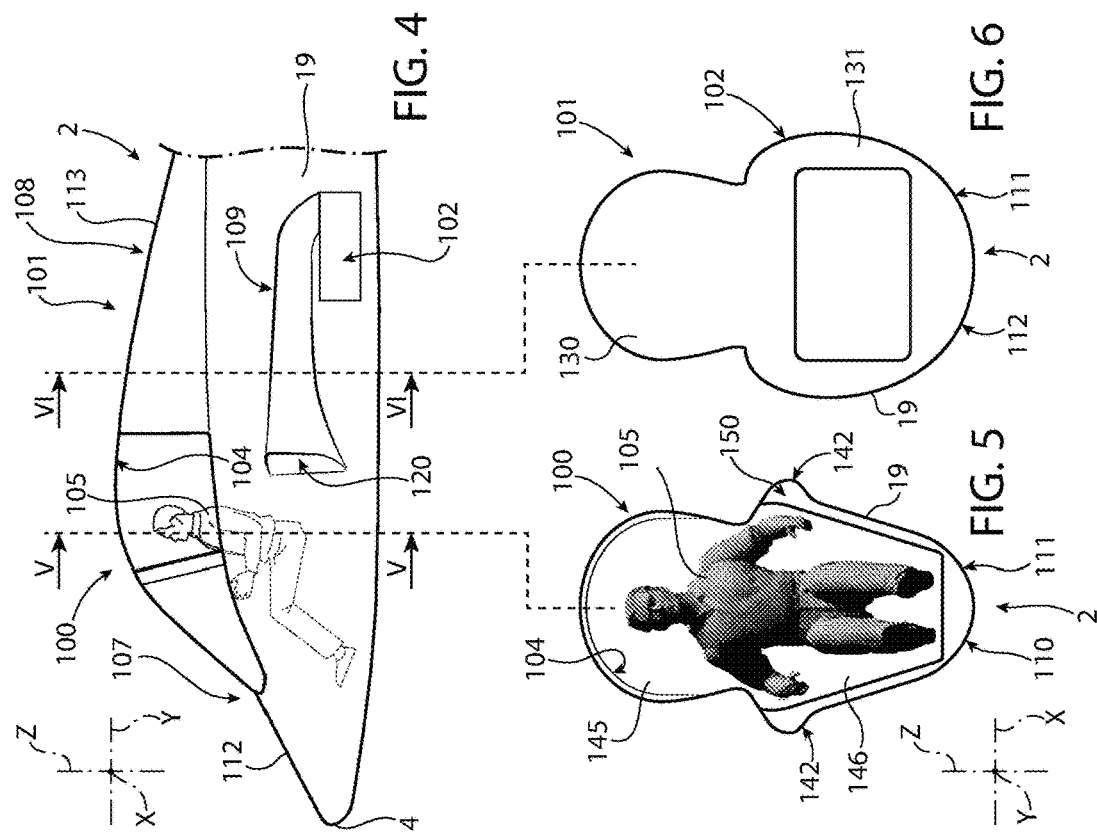

CONVERTIBLE AIRCRAFT CAPABLE OF HOVERING

CROSS-REFERENCE TO RELATED APPLICATIONS

This Patent Application is a U.S. National Phase Application under 35 U.S.C. § 371 of International Patent Application No. PCT/IB2023/054082, filed on Apr. 21, 2023, which claims priority from European Patent Application No. 22174103.6 filed on May 18, 2022, all of which are incorporated by reference as if expressly set forth in their respective entireties herein.

TECHNICAL FIELD

The present invention relates to an aircraft that is convertible between a first configuration of hovering flight or of flight along a predominantly vertical trajectory and a second forward flight or cruise configuration.

BACKGROUND

In the aviation sector, aeroplanes are normally used for high cruising speeds, in particular greater than 150 knots and high altitudes, e.g. above 30,000 feet. At cruising speeds and high altitudes, aeroplanes use fixed wings to generate the lift necessary to sustain the plane. A sufficient value of this lift can only be obtained by accelerating the aeroplane on runways of considerable length. These runways are also necessary to allow the same aeroplanes to land.

In contrast, helicopters normally have lower cruising speeds than aeroplanes and generate the necessary lift for sustenance through the rotation of the main rotor blades. As a result, helicopters can land/take off without the need for a horizontal speed and using particularly small surfaces. Moreover, helicopters are able to hover and to fly at relatively low altitudes and speeds, resulting thus as particularly manoeuvrable and suitable for demanding manoeuvres such as rescuing people in the mountains or at sea.

Nevertheless, helicopters have inherent limitations in terms of maximum operational altitude, which is around 20000 feet, and maximum operational speed, which cannot exceed 150 knots.

In order to meet the demand for aircrafts that have the same manoeuvrability and flexibility of use as the helicopter and at the same time overcome the inherent limitations mentioned above, convertiplanes are known and which constitute a type of convertible aircraft.

An example of a convertiplane is described in U.S. Pat. No. 10,011,349.

In more detail, the convertiplane described in the aforesaid application essentially comprises:
  a fuselage extending along a first longitudinal axis; and
  a pair of half-wings projecting cantilevered from respective parts of the fuselage that are opposite to each other, and having respective free ends opposite to the fuselage and aligned along a second transverse axis that is substantially to orthogonal the first longitudinal axis.
The convertiplane further comprises:
  a pair of nacelles housing the respective motors; and
  a pair of rotors which are rotatable around respective third axes and operatively connected to respective motors.
The rotors are inclinable with respect to the wing around a fourth axis, preferably parallel to the second axis.

The convertiplanes are also able to selectively assume:
  a first "helicopter" configuration, wherein the rotors are arranged with the respective third axes that are substantially vertical and orthogonal to the first axis of the convertiplane and orthogonal to the respective motors; or
  a second "aeroplane" configuration, wherein the rotors are arranged with respective third axes that are substantially parallel to the first axis of the same convertiplane and coaxial to the respective engines.

The convertiplane further comprises a tail portion provided with a pair of aerodynamic surfaces adapted to generate a second adjustable lift/downforce value that ensures a desired degree of longitudinal stability to the convertiplane in the second configuration.

Recently, several proposals for convertible aircrafts with electric propulsion have been developed, for example of the type described in patent application WO-A-2020/105045.

US-A-2021/253234 discloses a convertible aircraft according to the preamble of claim 1.

US-A-2020/277045 discloses a vertical take-off and landing (VTOL) aircraft having three lifting surfaces and separate lift and cruise systems. The VTOL aircraft may include a fuselage having a roll axis, a thrust rotor to produce a propulsion thrust, first and second rotor booms, first and second canard surfaces, first and second wing surfaces, first and second tail surfaces, and a plurality of lift rotors to produce a lifting thrust force. The plurality of lift rotors includes a first plurality of lift rotors positioned on the first rotor boom and a second plurality of lift rotors positioned on the second rotor boom. The first and second rotor booms may be substantially parallel to the roll axis of the fuselage, where the fuselage is positioned between the first and second rotor booms. Each of the first and second rotor booms may be secured to the aircraft at three locations.

US2020/108918 discloses an aircraft motor includes a bearing assembly including a first plurality of rotor alignment magnets; a magnet support structure fixedly mounted on a shaft of the motor in a spaced apart relation to the bearing assembly, the magnet support structure including a second plurality of rotor alignment magnets such that when the vertical thrust engine is disengaged, attraction between the first and second rotor alignment magnets causes the magnet support structure to rotate relative to the bearing assembly to an alignment position defined by the relative placement of north and south poles of the first and second plurality of rotor alignment magnets.

U.S. Pat. No. 9,120,560 discloses a vertical take-off and landing aircraft includes a fixed wing airframe having opposed left and right wings extending from left and right sides, respectively, of a fuselage having opposed leading and trailing extremities and an empennage located behind the trailing extremity. Four fixed, open and horizontal, vertical take-off and landing (VTOL) thrust rotors are mounted to the airframe in a quadrotor pattern for providing vertical lift to the aircraft, and a vertical, forward thrust rotor is mounted to the trailing extremity of the fuselage between the trailing extremity of the fuselage and the empennage for providing forward thrust to the aircraft. The four VTOL thrust rotors are coplanar being and operating in a common plane that is parallel relative to, and being level with, top surfaces of the left and right wings in and around a region of each of the four VTOL thrust rotors.

US-A-2021/197965 discloses an aircraft with a fuselage module and at least two vertical lift rotor modules supporting at least four rotor assemblies. Each rotor assembly is supported by a rotor boom having at least one boom free end and a boom mounting portion. Each rotor assembly has at least one vertical lift rotor mounted on the boom free end. Each boom mounting portion is removably couplable to the fuselage module. The vertical lift rotor modules are configured such that when coupled to the fuselage module, a pair of the rotor assemblies are located on each of laterally opposite sides of the fuselage module, and the rotor assemblies of each pair are respectively located forward of and aft of a wing center portion. A pair of wings are configured to be removably couplable to the wing center portion. The aircraft includes a forward thrust module removably couplable to the fuselage body.

There is a perceived need in the sector to realize a convertible aircraft for sports competition or for use in a personal air mobility environment, which exceeds the limits normally set by the certification requirements for aircraft intended for passenger transport.

In particular, there is a perceived need in the sector to ensure a high degree of stability of the aircraft while reducing the overall aerodynamic drag.

SUMMARY

Aim of the present invention is to realize a convertible aircraft which allows to satisfy at least one of the needs specified above in a simple and economical way.

According to the invention, this aim is achieved by a convertible aircraft as claimed in claim 1.

BRIEF DESCRIPTION OF THE DRAWINGS

For a better understanding of the present invention, three preferred non-limiting embodiments are described, by way of example only and with the aid of the accompanying drawings, wherein:

FIG. 4 shows the fuselage of the aircraft of FIG. 1 in a side view, with parts removed for clarity's sake;

FIGS. 5 and 6 are cross-sections along the lines V-V and VI-VI of the fuselage of FIG. 4;

FIG. 7 is a perspective view of a fuselage of the aircraft of FIG. 1;

DESCRIPTION OF EMBODIMENTS

Figure 1:
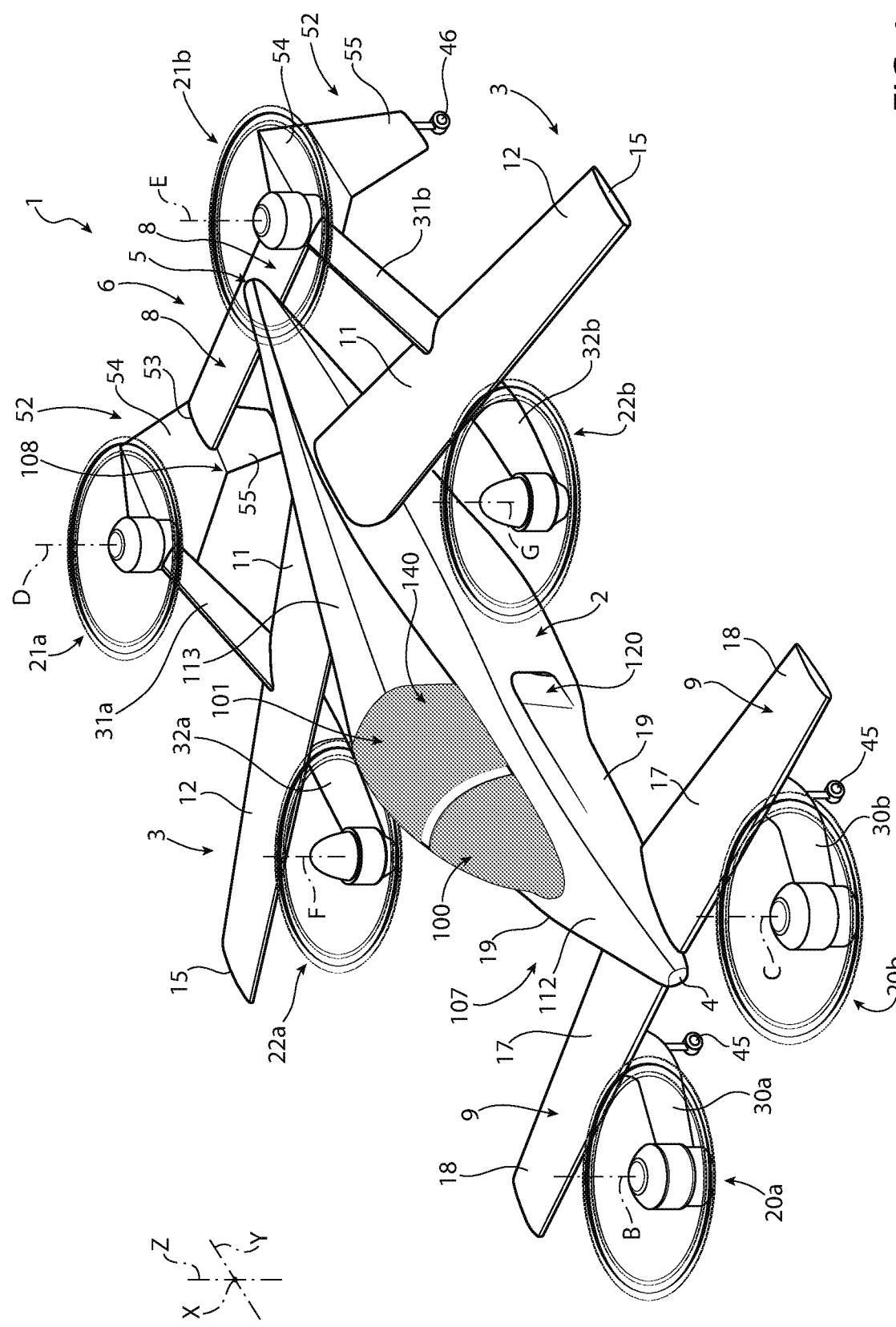
FIG. 1 is a perspective view from above and according to a first angle of view of a convertible aircraft, realized according to a first embodiment of the present invention.

With reference to FIGS. 1 to 11, 1 denotes an aircraft capable of hovering.

In greater detail, the aircraft 1 is selectively switchable between:
a first configuration (FIGS. 1, 2 and 3), wherein it performs a hovering manoeuvre or moves forward along a predominantly vertical trajectory; and
a second configuration (FIGS. 8 and 9), wherein it is in a forward flight condition and proceeds along a mainly horizontal trajectory.

It must be specified that in the following present disclosure, expressions such as "above", "below", "at the front", "behind" and the like are used to refer to a normal forward or "hovering" flight condition of the convertiplane 1 shown in FIGS. 1, 2, 3, 8 and 9.

It is possible to identify a set of axes integral to the aircraft 1 and originating in a centre of gravity of the aircraft 1 itself formed by:
a longitudinal axis Y of the aircraft 1 itself;
an axis X orthogonal to the axis Y; and
an axis Z orthogonal to the axes X, Y.

In a known manner, the rotations of the aircraft 1 around the axes Y, X, Z are associated with the following manoeuvres:
roll, i.e. rotation around the axis Y;
pitching, i.e. rotation around the axis X;
yaw, i.e. rotation around the axis Z.

More particularly, the aircraft 1 is intended for sports competitions or for use in a personal air mobility environment.

The aircraft 1 essentially comprises:
a fuselage 2 which is elongated along the axis Y and defining a nose 4 and a tail 5 of the aircraft 1;
a pair of half-wings 3 extending cantilevered from respective mutually opposite sidewalls 19 of the fuselage 2 and transversely to the axis Y; and
a tail portion 6 projecting cantilevered from the tail 5 of the fuselage 2 transversely to the fuselage 2.

With reference to the normal forward flight operating conditions, the aircraft 1 proceeds in a direction oriented from the tail 5 to the nose 4 parallel to the axis Y.

The half-wings 3 are intended to provide a first lift value to the aircraft 1 which is adapted to sustain the aircraft 1 arranged in the second configuration.

The half-wings 3 comprise respective free ends 15 opposite the fuselage 2.

The half-wings 3 extend above the fuselage 2.

The half-wings 3 are divergent from each other proceeding from the fuselage 2 towards the respective free ends 15.

In the case shown, the half-wings 3 comprise:
respective root portions 11 projecting cantilevered from respective sidewalls 19; and
respective end portions 12 arranged above the fuselage 2 and defining the respective ends 15 of the half-wings 3 themselves.

The tail portion 6 comprises, in turn, an aerodynamic surface 8 adapted to generate a second lift/downforce value to ensure a desired degree of longitudinal stability to the aircraft 1 itself arranged in the second configuration.

Preferably, the half-wings 3 have negative deflection and/or negative dihedral angle.

The half-wings 3 are, moreover, without movable aerodynamic surfaces, such as appendages or flaps.

Preferably, the aircraft 1 further comprises a pair of canard-type aerodynamic surfaces 9 projecting cantilevered from respective mutually opposite sides of the nose 4 of the fuselage 2 and adapted to generate a third lift/downforce value to ensure the desired degree of longitudinal stability to the aircraft 1 itself arranged in the second configuration.

The aerodynamic surfaces 9 comprise, in turn:

respective root portions 17 projecting cantilevered from and connected to respective sidewalls 19 of the fuselage 2; and respective end portions 18 arranged on the opposite side of the corresponding root portions 17 with respect to the fuselage 2.

Figure 3:
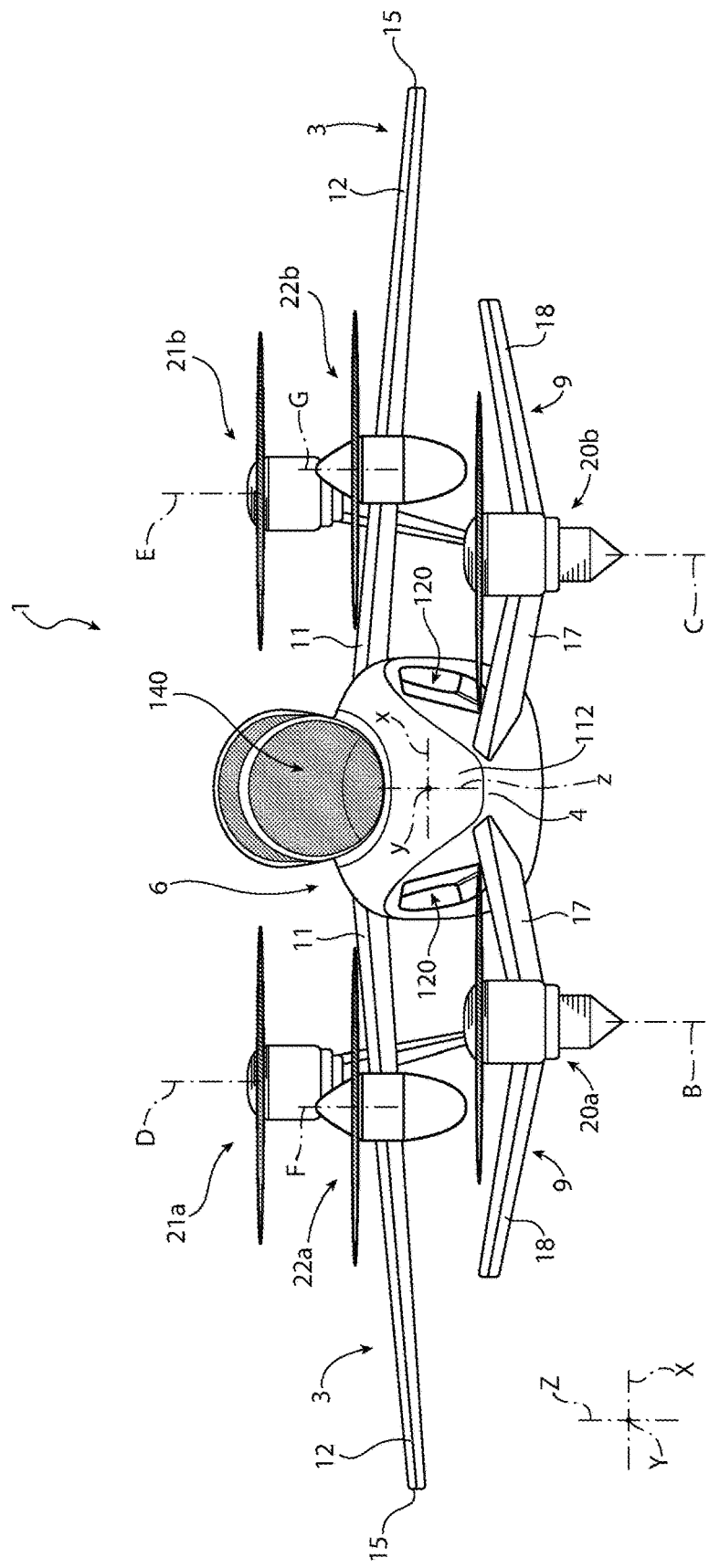
FIG. 3 shows the aircraft of FIG. 1 in a front view.

In particular, the root 17 and end 18 portions are inclined to each other (FIG. 3).

In the case shown, the wingspan of the half-wings 3 is greater than the wingspan of the aerodynamic surface 8.

The wingspan of the aerodynamic surfaces 9 is greater than the wingspan of the aerodynamic surface 8.

In this description, the term "wingspan" means the distance between opposite free ends 15, of the respective half-wings 3 and opposite free ends of the aerodynamic surfaces 8, 9.

The aerodynamic surfaces 9 are arranged below the half-wings 3 (FIG. 3).

The fuselage 2 further comprises (FIGS. 4 to 7):

a pair of portions 100, 101 arranged one after the other, proceeding along the axis Y from the nose 4 towards the tail 5; and an electric power source 102 (only schematically shown in FIGS. 4, 6 and 8) arranged inside the portion 101 of the fuselage 2.

The source 102 could comprise a plurality of electric batteries, a plurality of fuel cells, or an electric generator.

The portion 100 defines a housing 104 for a first crew member 105.

The portions 100, 101 respectively define a first and a second section 110, 111 (FIGS. 5, 6 and 11) in a plane orthogonal to the axis Y.

The portion 101 further comprises a pair of air intakes 120 that are open towards the outside of the fuselage 2, towards the nose 4, and fluidically connected with the source 102 so as to convey, in use, a flow of cooling air onto the source 102 itself, following the forward motion of aircraft 1.

The section 111 has a larger area than the section 110.

The air intakes 120 are arranged externally to said portion 100 and on respective mutually opposite sidewalls 19 of the portion 100, in a view of the aircraft 1 parallel to the axis Y.

The fuselage 2 houses a conveying duct 109 (FIG. 4) adapted to convey fresh cooling air onto the source 102 and fluidically connected with the air intakes 120.

The section 111 is symmetrical with respect to the axes Z, Y and comprises, in turn (FIG. 6):

an area 130; and an area 131 with greater extension than the area 130, housing the source 102 and defining said air intakes 120.

The area 131 is arranged below the area 130 with respect to the axis Z, with reference to the normal forward position of the aircraft 1.

The area 131 projects laterally from both sides of the area 130, with reference to the axis X.

The fuselage 2 further comprises a transparent dome 140 adapted to cover the housing 104 for the first crew member 105.

The dome 140 is carried by the portion 100.

The dome 140 can slide or be opened laterally or towards the tail 5, in the case shown.

The section 110 is also symmetrical with respect to the axes Y, Z and comprises, in turn (FIG. 5):

an area 145 arranged at the area 130 along the axis Y; and an area 146 arranged at the area 131 along the axis Y and arranged below the area 145 with respect to the axis Z, with reference to the normal forward position of the aircraft 1.

The area 145 is contained in the area 130 and the area 146 is contained in the area 131, in a view of the aircraft 1 according to a direction parallel to the axis Y.

The section 110 further comprises an area 150 interposed between the areas 145, 146 along the axis Z.

The area 145 is shaped to accommodate the head of the first crew member 105 and the area 146 is shaped to support the legs of the aforesaid first crew member 105.

The area 150 projects from both sides of the areas 145, 146, with reference to the axis X, so as to define two lateral fairings 142 adapted to accommodate respective arms of the first crew member 105.

In this way, the section 100 defines a safety cell for the first crew member 105.

The aircraft 1 further comprises (FIG. 1):

a portion 107 interposed between the nose 4 and the portion 100 along the axis Y; and a portion 108 interposed between the portion 101 and the tail 5 along the axis Y.

The half-wings 3 are fixed to the portion 108.

The portions 107, 108 are delimited above by respective stretches 112, 113.

The stretch 112 extends between the domes 140 and the nose 4 along the axis Y. The stretch 112 is inclined with respect to the axis Y and extends below the dome 140 at progressively increasing distances from the dome 140 proceeding towards the nose 4.

The stretch 113 extends between the portion 101 and the tail 5 along the axis Y. The stretch 113 is inclined with respect to the axis Y and extends below the portion 101 at progressively increasing distances from the dome 140 proceeding towards the tail 5.

The portions 100, 101 are joined together parallel to the axis Y.

The fuselage 2, the half-wings 3 and the aerodynamic surfaces 8, 9 have respective foam inserts (not shown).

Figure 2:
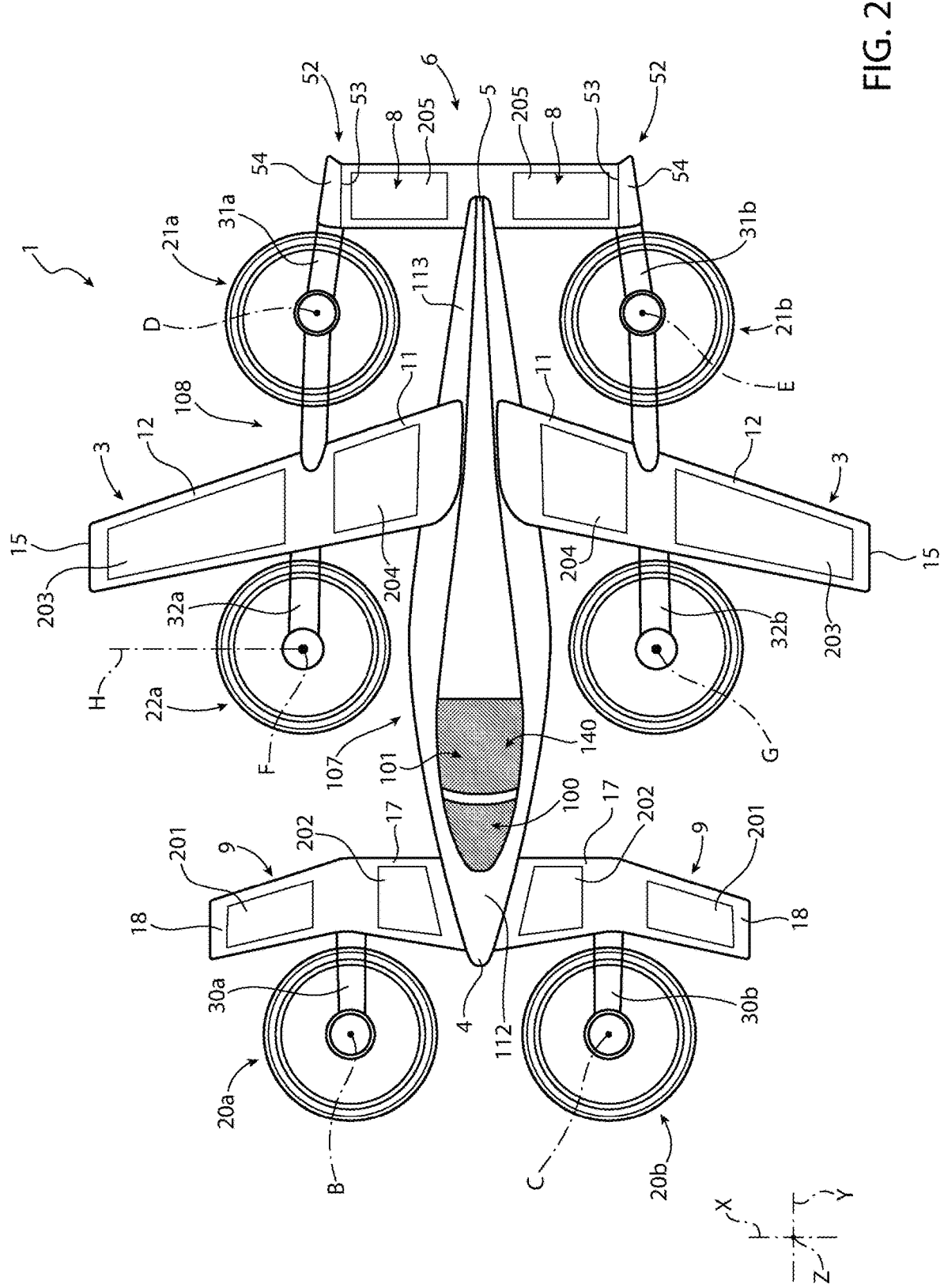
FIG. 2 shows the aircraft of FIG. 1 in a top view.

With reference to FIG. 2, the aerodynamic surfaces 9 comprise respective foam inserts 201, 202 carried respectively by the corresponding root 17 and end 18 portions.

The half-wings 3 comprise respective foam inserts 203, 204 carried respectively by the corresponding root 11 and end 12 portions.

The aerodynamic surfaces 8 comprise respective foam inserts 205.

The inserts 201, 202; 203, 204; 205 confer structural strength to the aerodynamic surface 9, to the half-wings 3 and to the aerodynamic surface 8, and confer buoyancy capacity to the aircraft 1.

Figure 8:
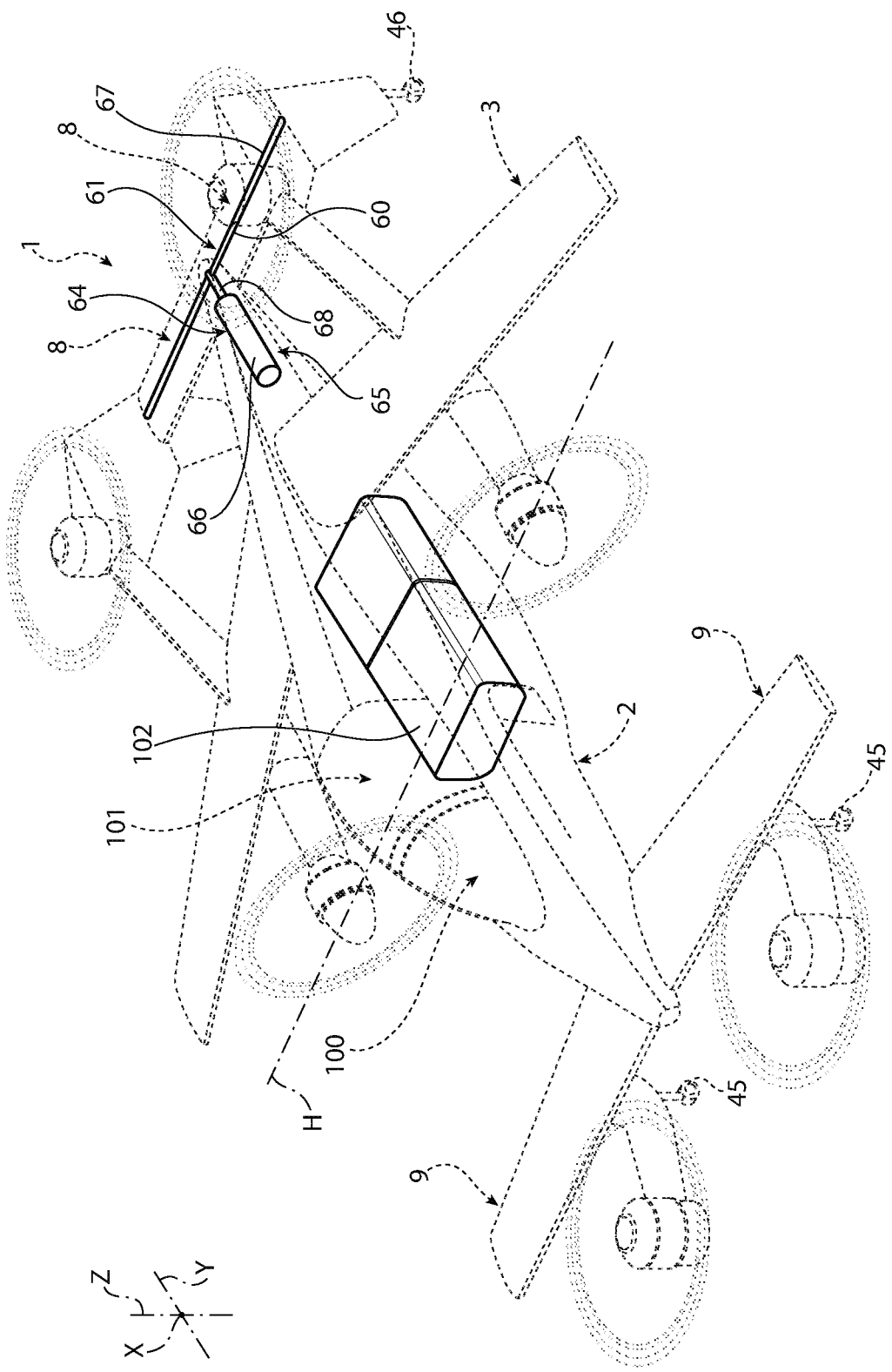
FIG. 8 is a perspective view of the aircraft of FIGS. 1 to 7, with first components in transparency for clarity's sake.
Figure 9:
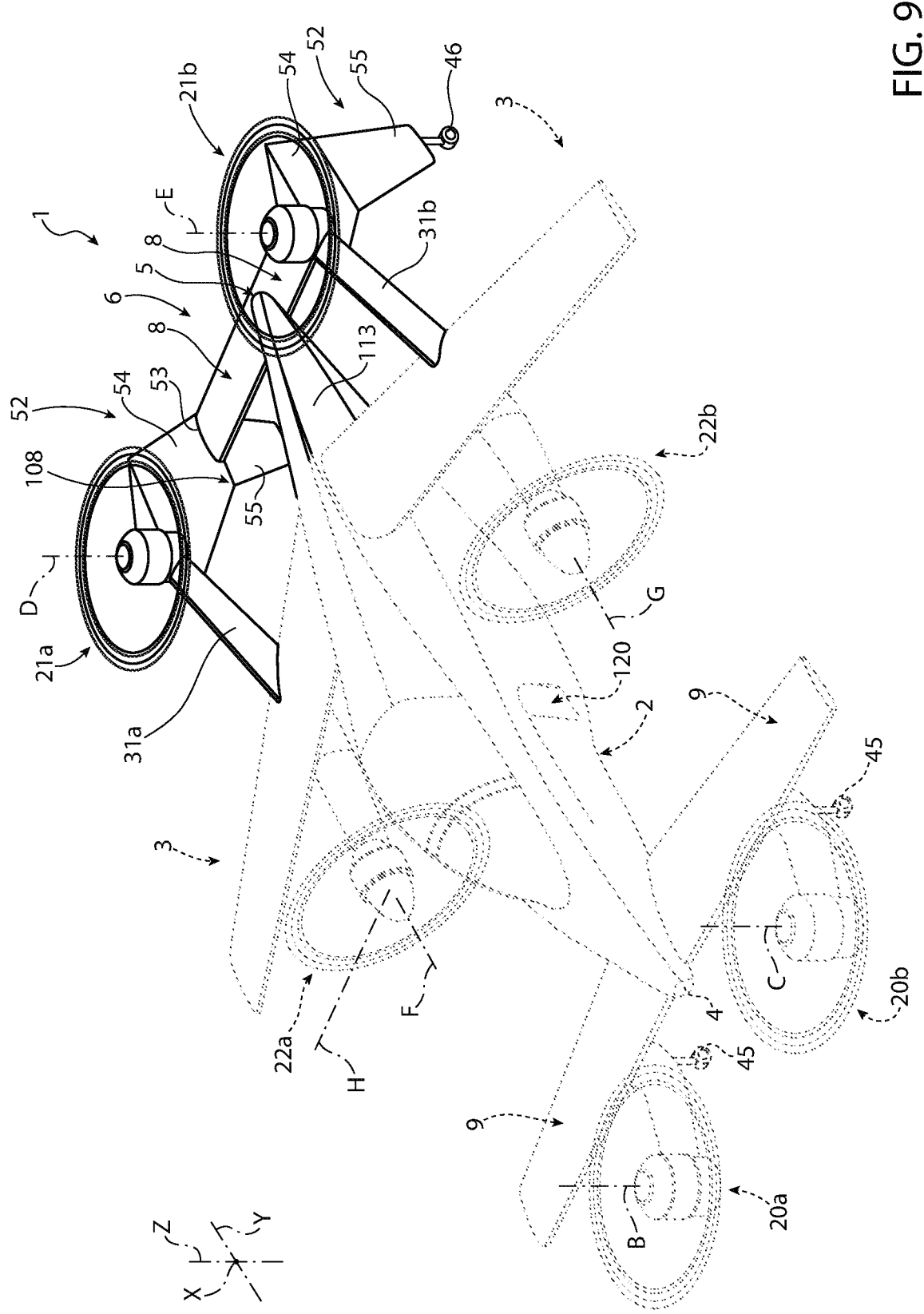
FIG. 9 is a perspective view of the aircraft of FIGS. 1 to 7, with second components in transparency for clarity's sake.
Figure 10:
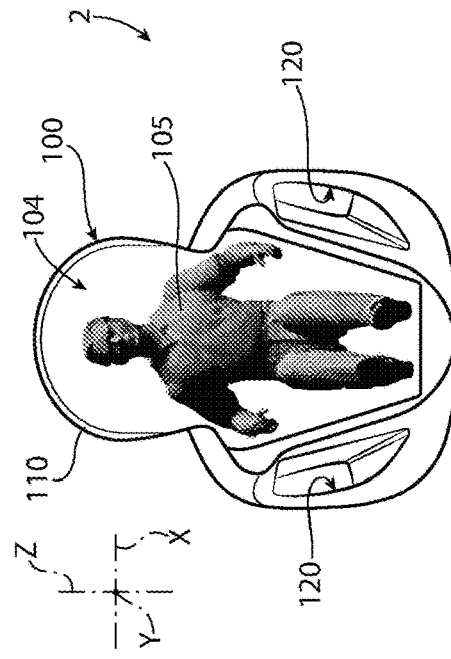
FIGS. 10 and 11 are front views of the aircraft of FIGS. 1 to 9, respectively with third and fourth components not shown for clarity's sake.
Figure 11:
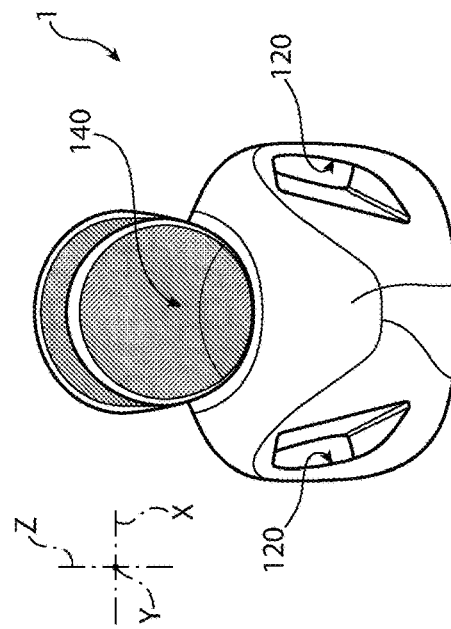

The aircraft 1 further comprises (FIGS. 1 to 3):

a pair of rotors 20a, 20b which are rotatable around respective fixed axes B, C with respect to the fuselage 2;

a pair of rotors 21a, 21b which are rotatable around respective fixed axes D, E with respect to the fuselage 2; and a pair of rotors 22a, 22b which are rotatable around respective axes F, G and inclinable with respect to an axis H (indicated only in FIG. 2) between a first position that is assumed when the aircraft 1 is in the first configuration (FIGS. 1 to 3) and a second position that is assumed when the aircraft 1 is in the second configuration (FIGS. 8 and 9).

In the shown case, the axes F, G of the rotors 22*a*, 22*b* are inclinable with respect to the axis H by more or less fifteen degrees towards the nose 4 or the tail 5 with respect to the axis Z.

Figure 12:
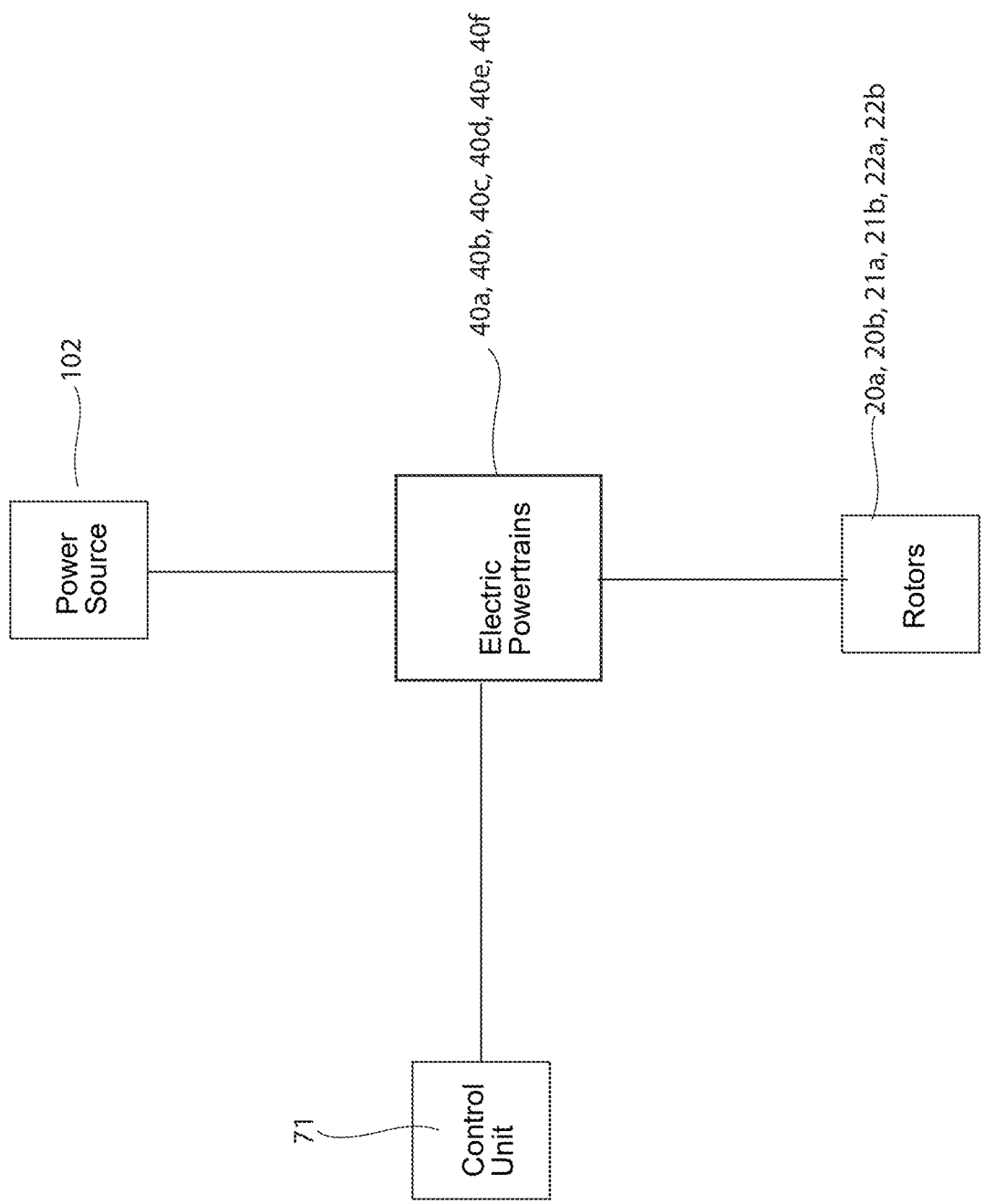
FIG. 12 is a functional diagram of some components of the aircraft of FIGS. 1 to 11.

The aircraft 1 further comprises:
- a plurality of electric powertrains 40*a*, 40*b*, 40*c*, 40*d*, 40*e*, 40*f* (only schematically shown in FIG. 12) adapted to be electrically powered wholly or partly by the source 102 and to drag into rotation respective rotors 20*a*, 20*b*, 21*a*, 21*b*, 22*a*, 22*b*; and
- a control unit 71 (only schematically shown in FIG. 12) receiving as input a plurality of control signals provided by the crew or by an autopilot or a remote control system, and programmed to provide as output a plurality of commands to command the electric powertrains 40*a*, 40*b*, 40*c*, 40*d*, 40*e*, 40*f* so that the respective rotors 20*a*, 20*b*; 21*a*, 21*b*; 22*a*, 22*b* provide desired values of the relative thrusts.

In greater detail, the control unit 71 is programmed to command the rotors 20*a*, 20*b*; 21*a*, 21*b*; 22*a*, 22*b* to generate respective mutually independent thrusts.

More particularly, the control unit 71 is programmed to command the rotors 20*a*, 20*b*; 21*a*, 21*b*; to generate respective thrusts having a resultant which is parallel to the axis Z, both when the aircraft 1 is in the first configuration and when the aircraft 1 is in the second configuration.

The control unit 71 is programmed to command the rotors 20*a*, 20*b*; 21*a*, 21*b* to generate respective zero thrusts under predetermined operating conditions and when the aircraft 1 is in the first configuration.

The axes B, C; D, E and F, G are arranged symmetrically to the axis Y.

In the case shown, the axes B, C, D and E are parallel to each other and parallel to the axis Z.

The axes B, D, F; C, E, G are aligned with each other orthogonally to the axis Y when the aircraft 1 is arranged in the first configuration.

The axes F, G are arranged parallel to the axis Z when the rotors 22*a*, 22*b* are arranged in the first position.

The axes F, G are arranged orthogonally to the axes B, C; D, E and parallel to the axis Y when the rotors 22*a*, 22*b* are arranged in the second position.

In one embodiment, the rotors 20*a*, 20*b*; 21*a*, 21*b*; 22*a*, 22*b* are with fixed pitch.

The aircraft 1 further comprises (FIG. 2):
- a pair of supports 30*a*, 30*b* in order to support respective rotors 20*a*, 20*b* in a fixed manner with respect to respective aerodynamic surfaces 9;
- a pair of supports 31*a*, 31*b* in order to support respective rotors 21*a*, 21*b* in a fixed manner with respect to respective half-wings 3 and to the tail portion 6; and
- a pair of supports 32*a*, 32*b* in order to support respective rotors 22*a*, 22*b* to respective half-wings 3 in an inclinable manner with respect to the axis H.

Preferably, the supports 32*a*, 32*b* are spaced apart from the ends 15 of the respective half-wings 3, with reference to an extension direction of the same half-wings 3.

The supports 30*a*, 30*b* are spaced apart from the free ends of the respective aerodynamic surfaces 9, with reference an extension direction of the same aerodynamic surfaces 9.

In particular, the supports 30*a*, 30*b* are conformed as respective plates projecting cantilevered below from respective aerodynamic surfaces 9 in front of the nose 4 and lying on respective planes orthogonal to the direction Y and arranged vertically in the normal position of the aircraft 1 (FIG. 1).

The axes B, C are arranged in front of the nose 4.

The axes D, E are arranged in front of the respective aerodynamic surface 8.

The rotors 22*a*, 22*b* are interposed between the respective half-wings 3 and the nose 4 along the axis Y both when the aircraft 1 is arranged in the first configuration and when the aircraft 1 is arranged in the second configuration.

The rotors 22*a*, 22*b* are arranged above the respective half-wings 3 when the aircraft 1 is arranged in the first configuration (FIGS. 1 to 3), and in front of the respective half-wings 3 when the aircraft 1 is arranged in the second configuration (FIGS. 8 and 9).

With particular reference to FIG. 9, the tail portion 6 essentially comprises
- the aerodynamic surface 8 extending from respective mutually opposite sides of the tail 5 and lying on a plane substantially orthogonal to the axis Z; and Advantageously, the tail portion 6 further comprises a pair of fins 52 arranged transversely to the aerodynamic surface 8; each fin 52 comprises, in turn:
- a portion 54 extending from a first side of said aerodynamic surface 8; and
- a second portion 55 extending from a second side, opposite the first side of the aerodynamic surface 8;
- the supports 31*a*, 31*b* of each rotor 21*a*, 21*b* are furthermore connected to a corresponding said half-wing 3 and to a corresponding fin 52.

In more detail, the fins 52 ensure steering stability to the aircraft 1 in the second configuration.

The fins 52 project cantilevered from respective opposite ends 53 of the surface 8.

The portion 54 extends upwards starting from the relative end 53 with reference to the normal position of the aircraft 1 and lying on a plane inclined with respect to the axes Y, Z; and The portion 55 extends downwards starting from the relative end 53 with reference to the normal position of the aircraft 1, inclined with respect to the portion 54, and lies on a plane orthogonal to the axis X.

The supports 31*a*, 31*b* are conformed as rods parallel to the axis Y, arranged on respective mutual opposite sides of the fuselage 2, and extending integrally, each, between a respective half-wing 3 and the portion 55 of a respective fin 52.

The fins 52 define extensions of the respective supports 31*a*, 31*b* parallel to the axis Y.

The portions 54, 55 are arranged below the rotors 21*a*, 21*b*, with reference to the normal position of the aircraft 1.

In particular, the aerodynamic surface 8 comprises:
- a main portion 60; and
- an appendage 61 (shown only in FIG. 8) movably connected to the main portion 60.

In the shown case, the appendage 61 is arranged behind the main portion 60 with reference to the normal position of the aircraft 1, and is hinged to the main portion 60 around an axis parallel to the axes H, X.

The aircraft 1 further comprises an actuator 65 operable to rotate the appendage 61 with respect to the main portion 60 and around the axis parallel to the axes H, X.

The actuator 65 essentially comprises (FIG. 8):
- a fixed body 66 housed in the fuselage 2 and housing a servomotor 64;
- a rod 67 elongated parallel to the axes H, X and fixed to the appendage 61; and
- a rod 68 slidable with respect to the fixed body 66 parallel to the direction Y following actuation of the servomotor 64 and hinged, on the opposite side of the fixed body 66, to the rod 67 around the axis parallel to the axes H, X.

The aircraft 1 further comprises (FIGS. 1 and 8):

a pair of devices 45—for example, skids or carriages carried by respective aerodynamic surfaces 9; and a pair of devices 46—for example, skids or carriages carried by respective portions 55 from the fin 52 on the side opposite the surface 8.

The devices 45, 46 are flexibly mounted with respect to the aerodynamic surfaces 9 and to the portions 55, respectively.

The following describes the operation of the aircraft 1, with reference to a use in a sports competition and/or in a personal/urban air vehicle (PAV) environment.

The first crew member 105 accesses the portion 100 through the sliding or laterally openable dome 140.

Next, the first crew member 105 is accommodated in the portion 100 of the fuselage 2.

The source 102 powers, in whole or in part the powertrains 40a, 40b, 40c, 40d, 40e, 40f with electrical power.

The air intakes 120 convey fresh air into the duct 109, which continuously cools the source 102.

The control unit 71 receives as input a plurality of control signals provided by the crew, by an autopilot or a remote control system, and provides as output a plurality of commands to command the electric powertrains 40a, 40b, 40c, 40d, 40e, 40f independently of each other so that the respective rotors 20a, 20b; 21a, 21b; 22a, 22b provide desired values of the relative thrusts.

The aircraft 1 lands and takes off arranged in the first configuration with the rotors 22a, 22b arranged in the first position wherein the relative thrusts are directed parallel to the axis Z (FIGS. 8 and 9).

The aircraft 1 moves forward cruising in the second configuration with the rotors 22a, 22b arranged in the second position wherein the respective thrusts are arranged parallel to the axis Y (FIGS. 1, 2 and 3).

In the first configuration, the lift required to sustain the aircraft 1 is provided by the rotors 20a, 20b; 21a, 21b and 22a, 22b.

In the second configuration, the lift required to sustain the aircraft 1 is mostly provided by the half-wings 3. The rotors 20a, 20b; 21a, 21b can be deactivated, if necessary.

The control and the manoeuvrability of the aircraft around the axes X, Y, Z is obtained by appropriately acting on the values of the thrusts generated by the rotors 20a, 20b; 21a, 21b; 22a, 22b and/or on the relative inclination of the rotors 22a, 22b with respect to the axis H.

With reference to the second configuration, the variation of the angle of inclination of the appendage 61 through the actuator 65 contributes to controlling and manoeuvring the aircraft 1 with respect to the axis X.

Figure 13:
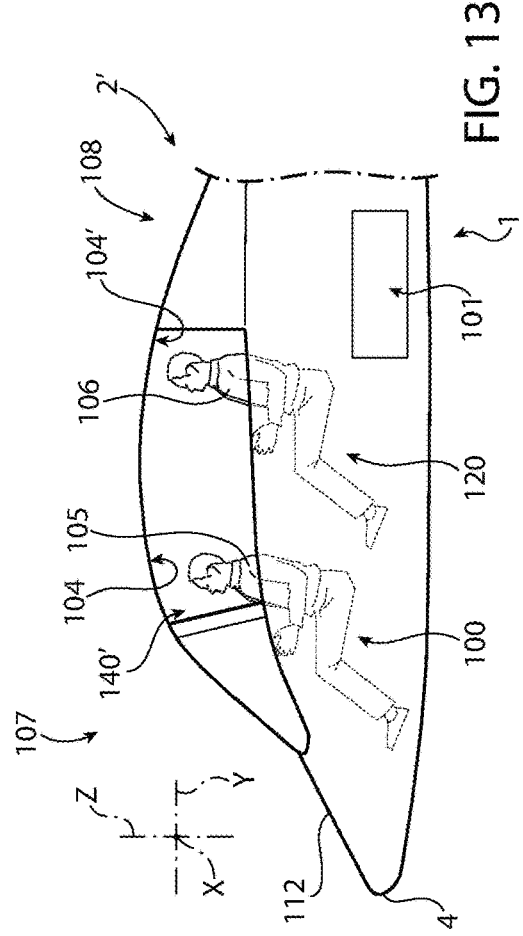
FIG. 13 is a side view of a fuselage of an aircraft realized according to a second embodiment of the invention, with parts removed for clarity's sake.

The fins 52 ensure steering stability to the aircraft 1 in the second configuration With reference to FIG. 13, 2' denotes a fuselage of an aircraft realized according to a second embodiment of the present invention.

The fuselage 2' is similar to the fuselage 2 and will be described below only in so far as it differs from the latter; equal or equivalent parts of the fuselages 2, 2' will be marked, where possible, with the same reference numbers.

In particular, the fuselage 2' differs from the fuselage 2 in that the portion 101 defines a housing 104' for a second crew member 106 arranged behind the housing 104 along the axis Y. In particular, the housing 104' allows the second member 106 to sit astride at least a front portion of the source 102.

The dome 140' also extends beyond the portion 101 towards the tail 5 so as to be arranged above the housing 104'.

The operation of the aircraft 1 with the fuselage 2' is completely similar to that of the fuselage 2 and is therefore not described in detail.

Figure 14:
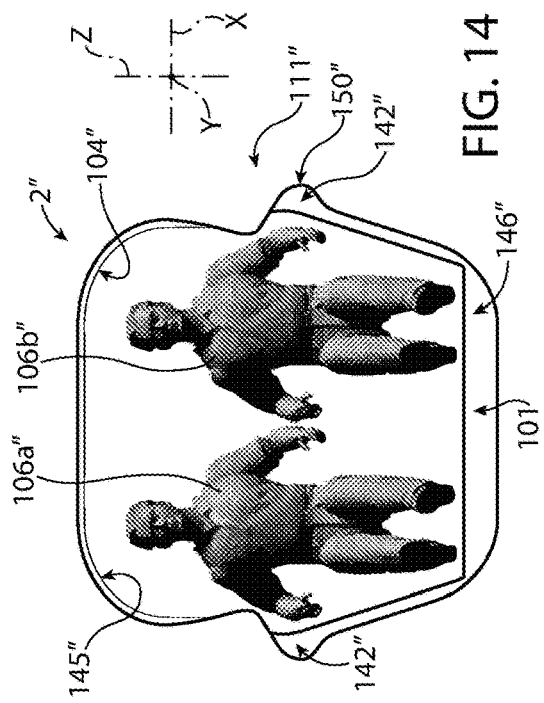
FIG. 14 is a cross-section of a fuselage of an aircraft realized according to a third embodiment of the invention, with parts removed for clarity's sake.

With reference to FIGS. 14, 2" denotes a fuselage of an aircraft realized according to a third embodiment of the present invention.

The fuselage 2" is similar to the fuselage 2 and will be described below only in so far as it differs from the latter; equal or equivalent parts of the fuselages 2, 2" will be marked, where possible, with the same reference numbers.

In particular, the fuselage 2" differs from the fuselage 2 in that the portion 101 defines a housing 104" for a second and a third crew member 106a", 106b" side by side along the axis X.

The section 111" is conformed similarly to the section 111 of the fuselage 2 but has increased overall dimensions in order to accommodate the two crew members.

In a nutshell, the section 111" comprises:

an area 145"; and an area 146" arranged below the area 146", with reference to the normal forward position of the aircraft 1; and an area 150" interposed between the areas 145, 146 along the axis Z.

The area 145" is shaped to accommodate the heads of the first and second crew members 106a", 106b" and the area 146" is shaped to support the legs of the aforesaid first and second crew member 105, 106.

The area 150" projects from both sides of the areas 145", 146", with reference to the axis X, so as to define two lateral fairings 142" adapted to accommodate the arms of the first member 105 and of the second member 106 of the crew.

The operation of the aircraft 1 with the fuselage 2" is completely similar to that of the fuselage 2 and is therefore not described in detail.

From an examination of the characteristics of the aircraft 1 according to the present invention, the advantages that it allows obtaining are evident.

In greater detail, the fins 52 of the tail portion 6 are arranged transversely to the aerodynamic surface 8, comprise respective portions 54, 55 extending above and below the aerodynamic surface 8 and are connected to the supports 31a, 31b of the rotors 21a, 21b.

Therefore, the fins 52 in addition to ensuring lateral-directional stability to the aircraft 1 effectively contribute to mechanically supporting the rotors 21a, 21b.

It is thus possible to make the supports 31a, 31b slimmer and lighter, thus reducing the overall aerodynamic drag of the aircraft 1 and consequently improving its sporting performance.

The fuselage 2, 2', 2" also houses the fixed body 66 of the actuator 65 adapted to control the position of the appendage 61 with respect to the main portion 60 of the tail plane 50.

Consequently, the geometry of the tail portion 6 can be defined without the need to house the aforesaid actuator 65, helping to further reduce the aerodynamic drag of the aircraft 1 compared to the solutions of the known type.

Each fin 52 has development almost completely orthogonal to the axis Z and is furthermore arranged below the rotors 21a, 21b, reducing the interference with the downward blow generated by the corresponding rotor 21a, 21b, and consequently improving the behaviour of the aircraft 1 in the first configuration.

The fins 52 carry respective carriages 46. It is thus possible to use the same component both to achieve the desired level of lateral-directional stability of the aircraft 1 and to support the carriages 46, without requiring dedicated support elements of the carriages 46 themselves. On the one hand, this further reduces the aerodynamic drag of the aircraft 1. On the other hand, it allows to guarantee the aircraft 1 four support points, two of which are defined by the carriages 45 and two of which are defined by the carriages 46. In this way, the aircraft 1 shows high stability and safety during the manoeuvres of loading/unloading the source 102 and/or of ascent/descent of the crew.

It is clear that the aircraft 1 described and shown herein may be subject to modifications and variations without thereby departing from the scope of protection defined by the claims.

In particular, the fuselage 2, 2', 2'' could comprise a single air intake 120 arranged at a relative sidewall 19.

The housing 104 could accommodate two first crew members 105 arranged side by side parallel to the axis X.

The aircraft 1 could comprise instead of the rotors 22a, 22b, one or more reaction or jet engines fuelled by fossil fuel, which are fixed with respect to the fuselage 2, and configured to generate a thrust parallel to the axis Y under forward flight conditions.

The aircraft 1 may not comprise the aerodynamic surface 8.

The axes B, C; D, E may not be parallel to the axis Z and may be inclined with respect to the axis Z by an angle ranging between −15 and +15 degrees. In particular, the axes B, C (D, E) could converge in the axis Z above or below the fuselage 2.

Some or all of the rotors 20a, 20b, 21a, 21b, 22a, 22b may have variable pitch.

The invention claimed is:

1. Aircraft (1), comprising:
   a fuselage (2, 2', 2'') with a nose (4) and a tail (5) arranged at mutually opposite sides along a first longitudinal axis (Y) of said aircraft (1);
   a pair of half-wings (3) arranged on respective mutually opposite lateral sides of said fuselage (2, 2', 2''2) and generating, in use, a first lift value;
   a first and a second rotor (22a, 22b) carried by respective said half-wings (3), respectively rotatable around a second and third axis (F, G) inclinable with respect to said fuselage (2, 2', 2''), and operable independently of each other;
   said second and third axis (F, G) being arranged on respective mutually opposite lateral sides of said fuselage (2, 2', 2'') and symmetrically with respect to said first axis (Y);
   said aircraft (1) being switchable between:
   a first hovering or take-off/landing flight configuration wherein said second and third axis (F, G) are arranged orthogonal to said first axis (Y); and
   a second forward flight configuration wherein said second and third axis (F, G) are arranged parallel to or inclined with respect to said first axis (Y);
   said aircraft (1) further comprising a tail portion (6) comprising a first aerodynamic surface (8) adapted to provide a second lift/downforce value;
   said aircraft (1) further comprising:
   a third and a fourth rotor (21a, 21b) rotatable respectively around a fourth and a fifth axis (D, E) that are fixed with respect to said aircraft (1); and
   support means (31a, 31b) adapted to support said third and fourth rotor (21a, 21b) with respect to said aircraft (1);
   said tail portion (6) further comprising a pair of fins (52) arranged transversely to said first aerodynamic surface (8);
   each said fin (52) comprising, in turn:
   a first portion (54) extending from a first side of said first aerodynamic surface (8); and
   a second portion (55) extending from a second side, opposite to said first of said surface (8);
   said support means (31a, 31b) of each of said third and fourth rotor (21a, 21b) being connected to a corresponding said half-wing (3) and to a corresponding said fin (52);
   said aircraft (1) further comprising an appendage (61) movable with respect to said first aerodynamic surface (8) to adjust said second lift/downforce value;
   said half-wings (3) being without movable aerodynamic surfaces, such as appendages or flaps;
   said aircraft (1) further comprising an actuator (65) adapted to command the movement of said appendage (61) with respect to said first aerodynamic surface (8);
   wherein said actuator (65) comprises, in turn:
   a fixed body (66) housed inside said fuselage (2); and
   a rod (67) operatively connected to said fixed body (66) and to said appendage (61);
   said support means (31a, 31b) of each said third and fourth rotors (21a, 21b) being fixed to said first portion (54) of the corresponding said fin (52);
   said support means (31a, 31b) being shaped as a pair of rods elongated parallel to said first axis (Y) and arranged on opposite sides of said fuselage (2);
   said fins (52) defining extensions of respective said rods parallel to said first axis (Y);
   said tail portion (6) projecting cantilevered from the tail (5) of said fuselage (2) transversely to said fuselage (2).

2. Aircraft according to claim 1, characterized in that said second portions (55) carry respective landing gear (46) of said aircraft (1).

3. Aircraft according to claim 1, characterized in that said first and second portion (54, 55) of each said fin (52) lie on respective planes inclined with respect to each other.

4. Aircraft according to claim 3, characterized in that said second portion (55) lies on a plane orthogonal to a sixth axis (X) transverse to said aircraft (1) and orthogonal to said first axis (Y).

5. Aircraft according to claim 1, characterized in that said first portion (54) is arranged above said first aerodynamic surface (8) and said second portion (55) is arranged below said first aerodynamic surface (8), with reference to a normal position of said aircraft (1).

6. Aircraft according to claim 1, characterized in that said fins (52) are each arranged below a corresponding said third and fourth rotor (21a, 21b), with reference to a normal position of said aircraft (1).

7. Aircraft according to claim 1, characterized in that it comprises a pair of third aerodynamic surfaces (9) adapted to provide second lift/downforce values and projecting cantilevered from respective mutually opposite lateral sides of said nose (4) of said fuselage (2).

8. Aircraft according to claim 7, characterized in that the wingspan of said first aerodynamic surface (8) is lower than the wingspan of said half-wings (3) and the wingspan of said third aerodynamic surface (9).

9. Aircraft according to claim 7, characterized in that said half-wings (3) and first and second aerodynamic surfaces (8, 9) have respective foam inserts.

10. Aircraft according to claim 1, characterized in that it comprises:

a fifth and sixth rotor (20*a*, 20*b*) respectively rotatable around a seventh and an eighth axis (B, C) that are fixed with respect to said fuselage (2, 2', 2").

11. Aircraft according to claim 10, characterized in that said second and third axis (F, G); fourth and fifth axis (D, E); and seventh and eighth axis (B, C) are arranged symmetrically with respect to said first axis (Y); and/or characterized in that said seventh, second and fourth axis (B, F, D) and said eighth, third and fifth axis (C, G, E) are aligned parallel to said first axis (Y) when said aircraft is in said second configuration.

12. Aircraft according to claim 1, characterized in that said fins (52) extend from the respective ends (53) of said first aerodynamic surface (8).

\* \* \* \* \*